(12) United States Patent
Liao

(10) Patent No.: US 10,161,563 B1
(45) Date of Patent: Dec. 25, 2018

(54) STAND CLAMP WITH EASE OF FORCE APPLICATION

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 0 days.

(21) Appl. No.: 15/692,472

(22) Filed: Aug. 31, 2017

(51) Int. Cl.
  *G10D 13/02* (2006.01)
  *F16M 13/02* (2006.01)
  *F16B 2/10* (2006.01)
  *G10G 5/00* (2006.01)
  *F16B 2/06* (2006.01)

(52) U.S. Cl.
  CPC .......... *F16M 13/022* (2013.01); *F16B 2/10* (2013.01); *G10D 13/026* (2013.01); *G10G 5/005* (2013.01); *F16B 2/065* (2013.01)

(58) Field of Classification Search
  USPC .......................................................... 84/421
  See application file for complete search history.

(56) References Cited

U.S. PATENT DOCUMENTS

| | | | | |
|---|---|---|---|---|
| 6,096,956 A * | 8/2000 | Hoshino | ............... | G10D 13/06 84/421 |
| 6,150,595 A * | 11/2000 | Vaglica | ............... | G10D 13/003 84/327 |
| 6,459,025 B1 * | 10/2002 | D'Addario | ............ | G10D 3/043 84/318 |
| 6,635,813 B2 * | 10/2003 | Campling | ............. | G10D 3/043 84/318 |
| 9,633,635 B2 | 4/2017 | Liao | | |

* cited by examiner

*Primary Examiner* — Christopher Uhlir
(74) *Attorney, Agent, or Firm* — Muncy, Geissler, Olds & Lowe, P.C.

(57) ABSTRACT

The stand clamp with ease of force application comprises a fixed part, a movable part and a screwing-lock part. The movable part is pivotally coupled to the fixed part. The screwing-lock part includes a bolt, a pressing plate, a rotating rod and a resetting assembly, wherein two ends of the bolt are provided with a threaded section and a ratchet wheel section respectively. Further, the rotating rod slips with respect to the bolt to form a reset position and an actuating position. The resetting assembly is linked to the bolt and the rotating rod, such that the rotating rod is in the reset position under an ordinary state. In addition, the rotating rod can freely rotate with respect to the bolt at the actuating position. Therefore, an operator can freely change the position of the rotating rod and apply a force with a most suitable application angle.

6 Claims, 7 Drawing Sheets

STAND CLAMP WITH EASE OF FORCE APPLICATION

FIELD OF THE INVENTION

The present invention relates to a stand clamp, and more particularly relates to a locking structure of the stand clamp.

BACKGROUND OF THE INVENTION

Refer to FIG. 1, according to a publication of U.S. Pat. No. 9,633,635 B2, a musical instrument, such as a pair of cymbals, a drum or a cow-bell, may be fixed to a stand (not shown), whereby they can be arranged around the performer.

The conventional stand clamp comprises a fixed part 1, a movable part 2 and a screwing-lock part 3, wherein the movable part 2 is pivotally coupled to a pivotal point 4 of the fixed part 1, and the movable part 2 is provided with an outer curved surface 5 at one side far away from the fixed part 1. The screwing-lock part 3 is configured to screwing-lock the outer curved surface 5 which passes through the fixed part 1 and presses the movable part 2, such that the movable part 2 rotates with respect to the fixed part 1 and the movable part 2 approaches to the fixed part 1, whereby the movable part 2 is clamped to the stand.

The conventional stand clamp can be clamped to the stand by rotating the screwing-lock part 3. Since the conventional screwing-lock part 3 is generally of a knob structure, it is quite difficult to clamp for those people who have less effort. If the screwing-lock part 3 is lengthened, the torque can be increased and the screwing-lock part can be easily clamped by an operator, but the lengthened screwing-lock part 3 will occupy a space and may not be stored easily. Once the screwing-lock part 3 is not clamped, it is possible to slip to cause drop of a musical instrument, such as a pair of cymbals, a drum or a cow-bell lest the performance be affected or the musical instrument be damaged, and it is obvious that the requirement on use cannot be satisfied.

SUMMARY OF THE INVENTION

Therefore, the primary objective of the present invention is to disclose a stand clamp with ease of force application, in which a rotating rod can freely rotate to a most suitable application angle and is then tightened.

To achieve the above-mentioned objective, the present invention proposes a stand clamp with ease of force application, which is to be locked and fixed to a stand and comprises a fixed part, a movable part and a screwing-lock part, wherein the movable part is pivotally coupled to the fixed part. The movable part rotates with respect to the fixed part to form a clamping area. The movable part is provided with an outer curved surface at one side far away from the fixed part. The screwing-lock part includes a bolt, a pressing plate, a rotating rod and a resetting assembly, wherein two ends of the bolt are provided with a threaded section and a ratchet wheel section respectively. The bolt presses the outer curved surface of the movable part across the pressing plate, and the threaded section passes through the pressing plate and is locked to the fixed part, such that the pressing plate presses the movable part to rotate to reduce the clamping area and to be locked and fixed to the stand. Further, the rotating rod slips with respect to the bolt to form a reset position and an actuating position. The resetting assembly is linked to the bolt and the rotating rod, such that the rotating rod is in the reset position under an ordinary state, and the rotating rod is provided with a ratchet which is engaged with the ratchet wheel section correspondingly at the reset position. In addition, the rotating rod can freely rotate with respect to the bolt at the actuating position.

Therefore, since the rotating rod can freely rotate with respect to the bolt at the actuating position, i.e., an operator can allow the rotating rod to be in the actuating position first and freely rotate the rotating rod, such that a most suitable application angle can be selected; while when the rotating rod is locked and fixed to the stand, it can return to the reset position by using the resetting assembly, such that the ratchet is engaged with the ratchet wheel section, and therefore the rotating rod rotates to drive the bolt to rotate, and further, the pressing plate is enabled to press the movable part to rotate to reduce the clamping area and to be locked and fixed to the stand.

DETAILED DESCRIPTION OF THE PREFERRED EMBODIMENTS

Figure 1:
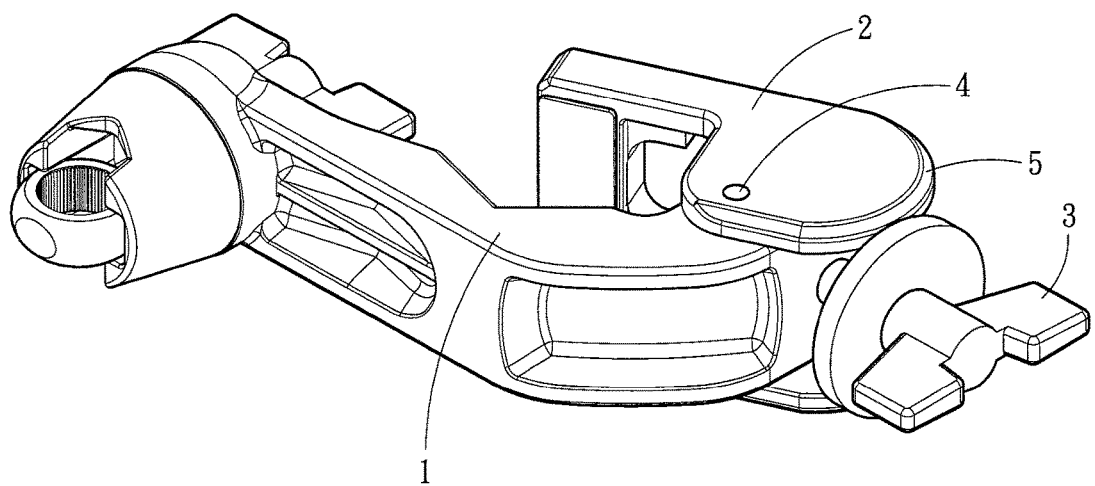
FIG. 1 is a schematic diagram showing the usage of a conventional stand clamp with ease of force application.
Figure 2:
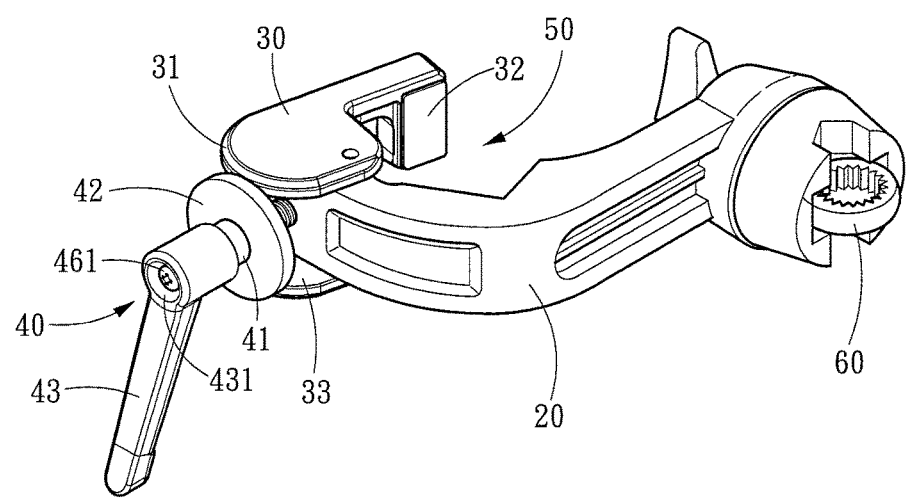
FIG. 2 is a combined structure diagram of the present invention.
Figure 3:
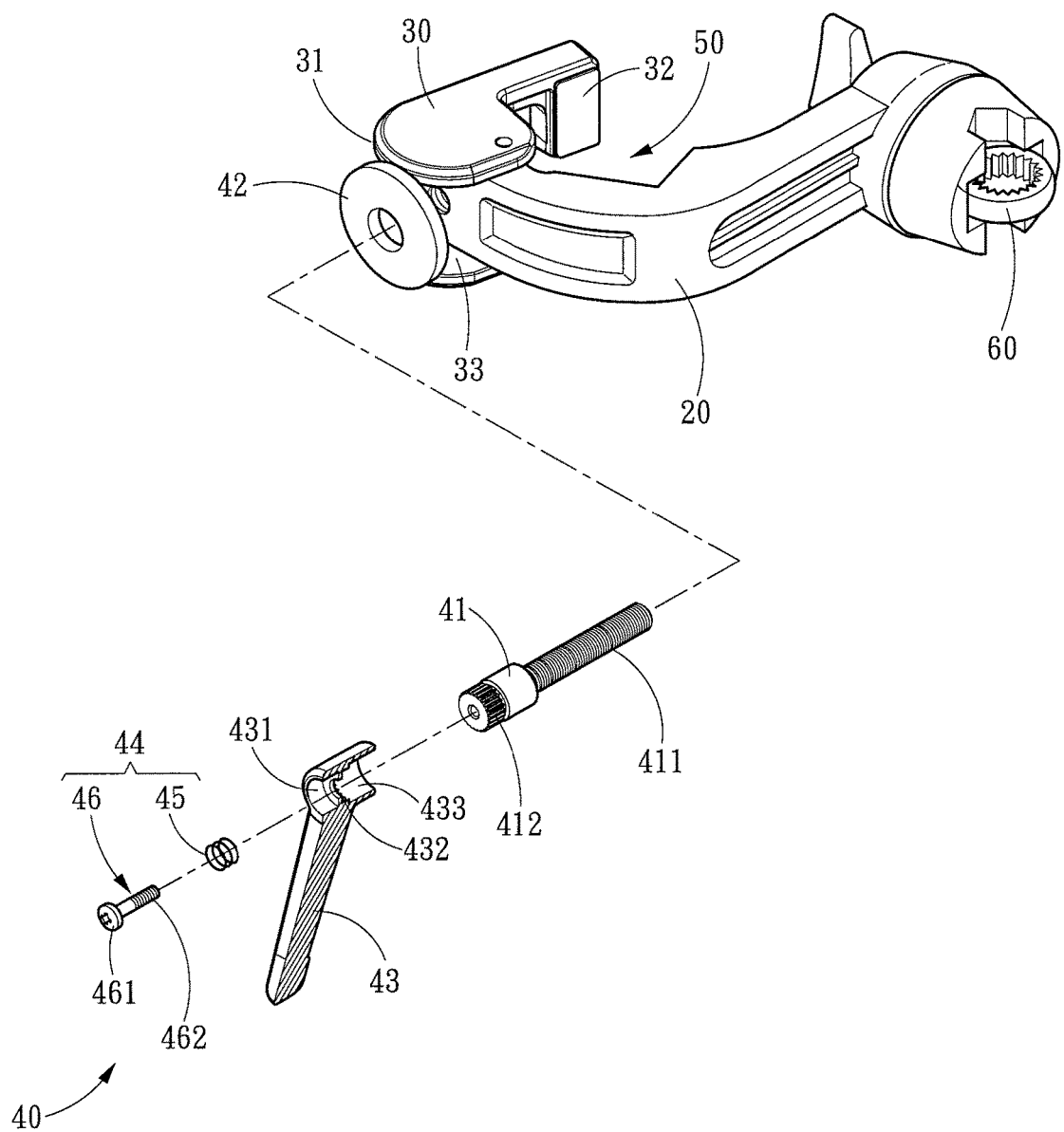
FIG. 3 is a locally exploded structure diagram of the present invention.

The preferred embodiments will be described in detail in cooperation with the attached drawings to demonstrate the technical contents, characteristics and efficacies of the present invention below.

Refer to FIG. 2, FIG. 3, FIG. 4A, FIG. 4B, and FIG. 5, the present invention proposes a stand clamp with ease of force application, which is to be locked and fixed to a stand 10 and comprises a fixed part 20, a movable part 30 and a screwing-lock part 40, wherein the movable part 30 is pivotally coupled to the fixed part 20. The movable part 30 rotates with respect to the fixed part 20 to form a clamping area 50. The movable part 30 is provided with an outer curved surface 31 at one side far away from the fixed part 20.

The screwing-lock part 40 is provided with a bolt 41, a pressing plate 42, a rotating rod 43 and a resetting assembly 44, wherein two ends of the bolt 41 are provided with a threaded section 411 and a ratchet wheel section 412 respectively. The bolt 41 presses the outer curved surface 31 of the movable part 30 across the pressing plate 42, and the threaded section 411 passes through the pressing plate 42 and is locked to the fixed part 20, such that the pressing plate 42 presses the movable part 30 to rotate to reduce the clamping area 50 and to be locked and fixed to the stand 10.

Figure 4A:
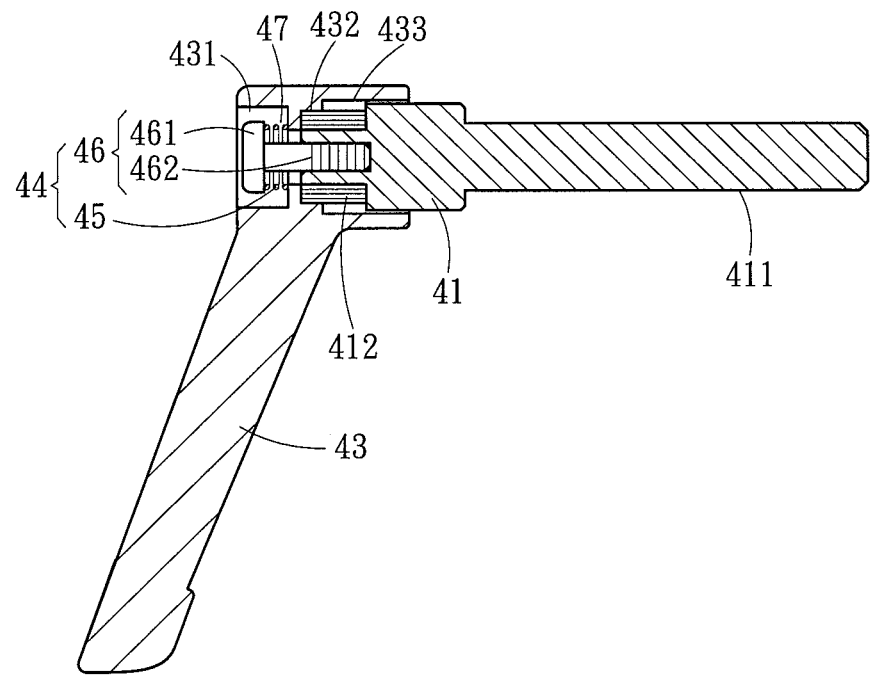
FIG. 4A is a sectional schematic diagram when the rotating rod is located in a reset position according to the present invention.
Figure 4B:
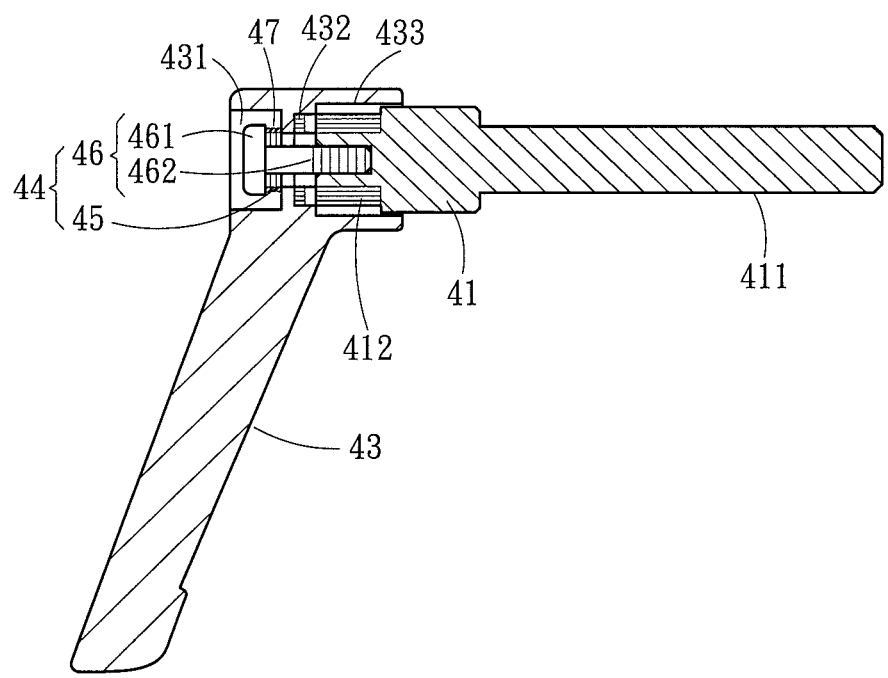
FIG. 4B is a sectional schematic diagram when the rotating rod is located in an actuating position according to the present invention.

Further, the rotating rod 43 slips with respect to the bolt 41 to form a reset position (as shown in FIG. 4A) and an actuating position (as shown in FIG. 4B). The resetting assembly 44 is linked to the bolt 41 and the rotating rod 43, such that the rotating rod 43 is in the reset position under an ordinary state, and the rotating rod 43 is provided with a ratchet 432 which is engaged with the ratchet wheel section 412 correspondingly at the reset position. In addition, the rotating rod 43 can freely rotate with respect to the bolt 41 at the actuating position. In implementation, the resetting assembly 44 may be provided with a compression spring 45 and a nut 46. The nut 46 is provided with a head part 461 and a screwing-lock stud 462, wherein the screwing-lock stud 462 passes through the rotating rod 43 and is locked to the bolt 41, and a variable gap 47 is formed between the head part 461 and the rotating rod 43. The compression spring 45 is provided inside the variable gap 47 in a compressed manner. The rotating rod 43 is kept in the reset position under an ordinary state, and the rotating rod 43 slips with respect to the bolt 41 to compress the variable gap 47, till the ratchet 432 is separated from the ratchet wheel section 412 and is in the actuating position.

In addition, for aesthetic and safety reasons, the rotating rod 43 may be provided with a recessed space 431 for accommodating the head part 461. The recessed space 431 can prevent the head part 461 from exposing and hide the compression spring 45. Further, the rotating rod 43 may be provided with an inner ring surface 433 through which the ratchet wheel section 412 passes and on which the ratchet 432 is formed.

Moreover, each of the movable part 30 and the fixed part 20 is provided with a cushion 32 contacting the stand 10, and when they are clamped to the stand 10, the stability can be increased. In addition, the movable part 30 may be provided with an accommodating groove 33 in which the fixed part 20 can be embedded.

Figure 5:
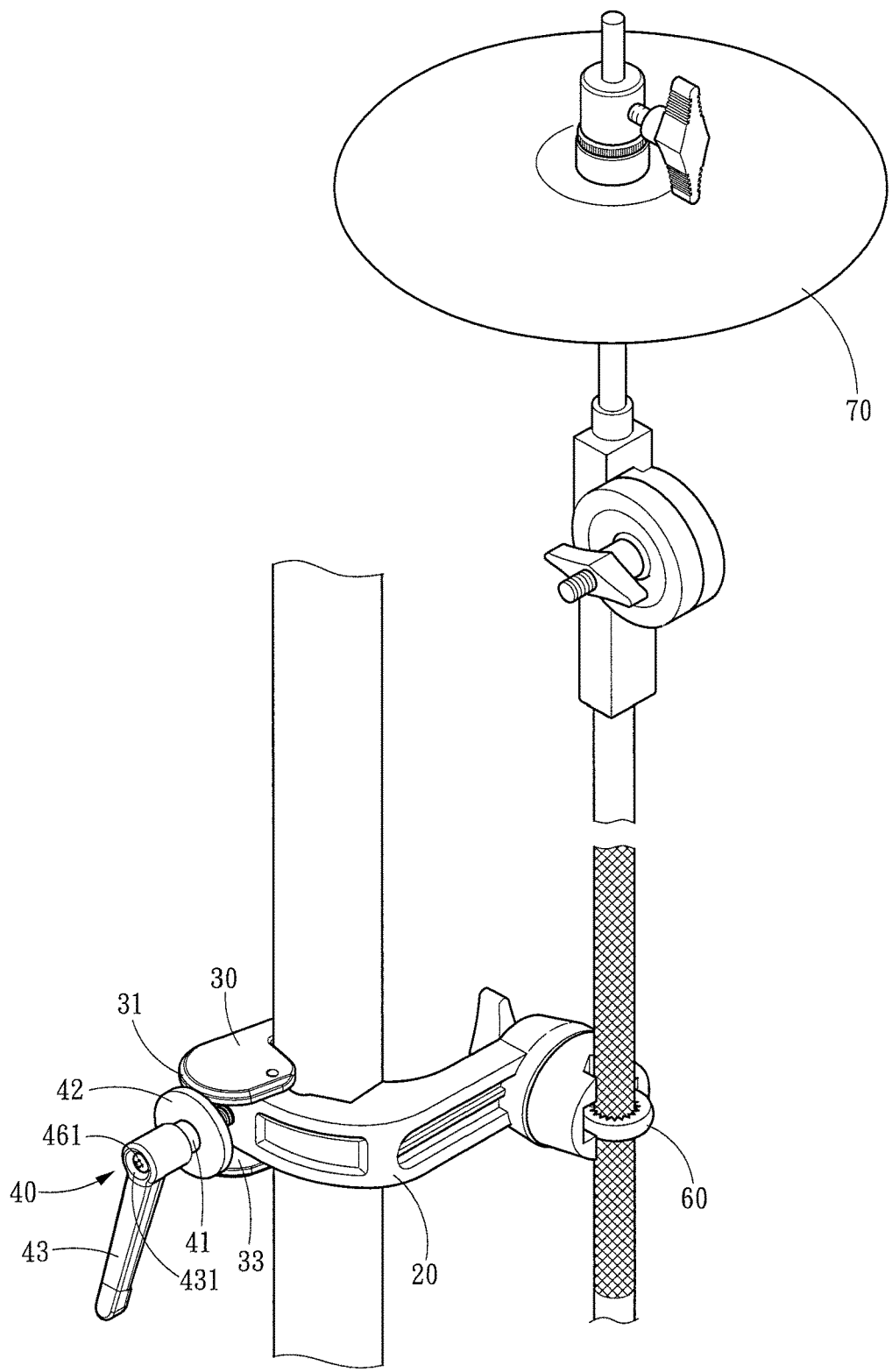
FIG. 5 is an implementation schematic diagram of the present invention.
Figure 6:
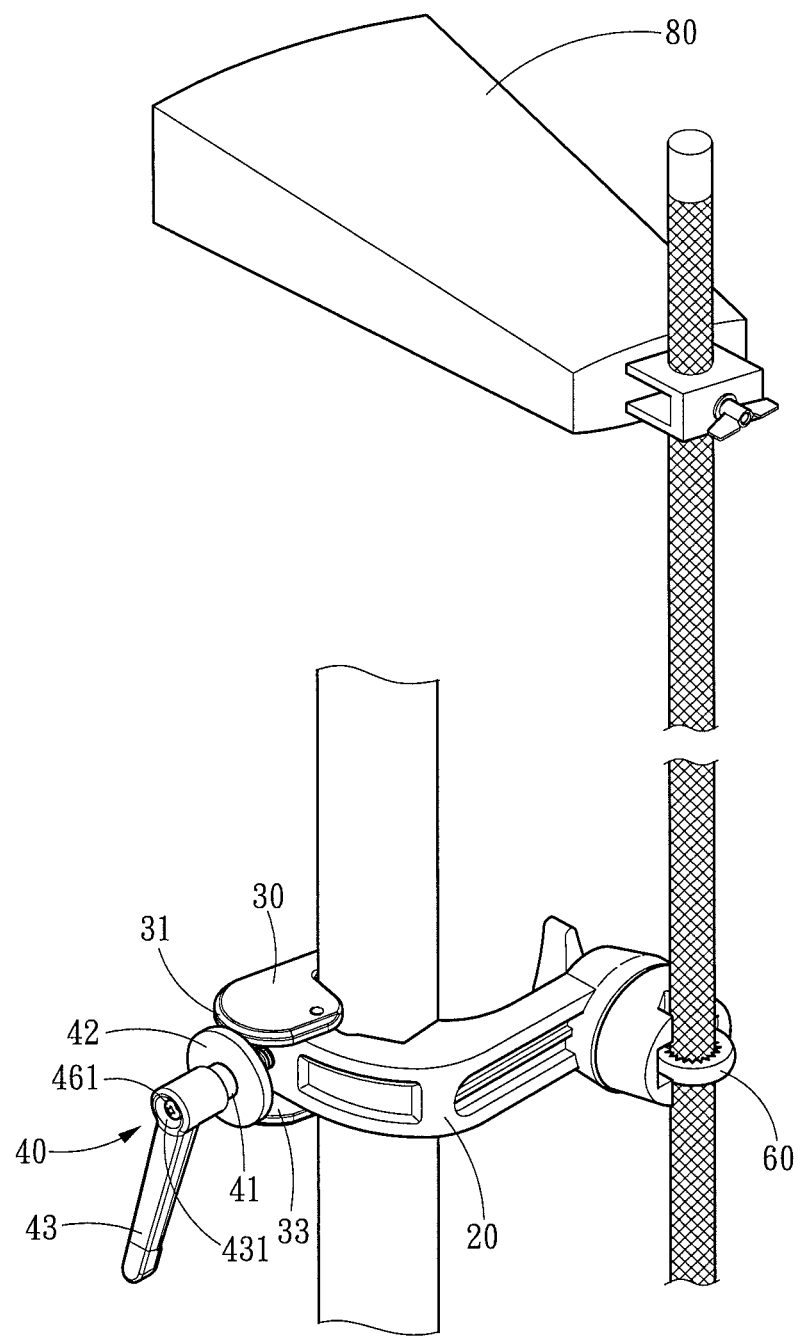
FIG. 6 is another implementation schematic diagram of the present invention.
Figure 7:
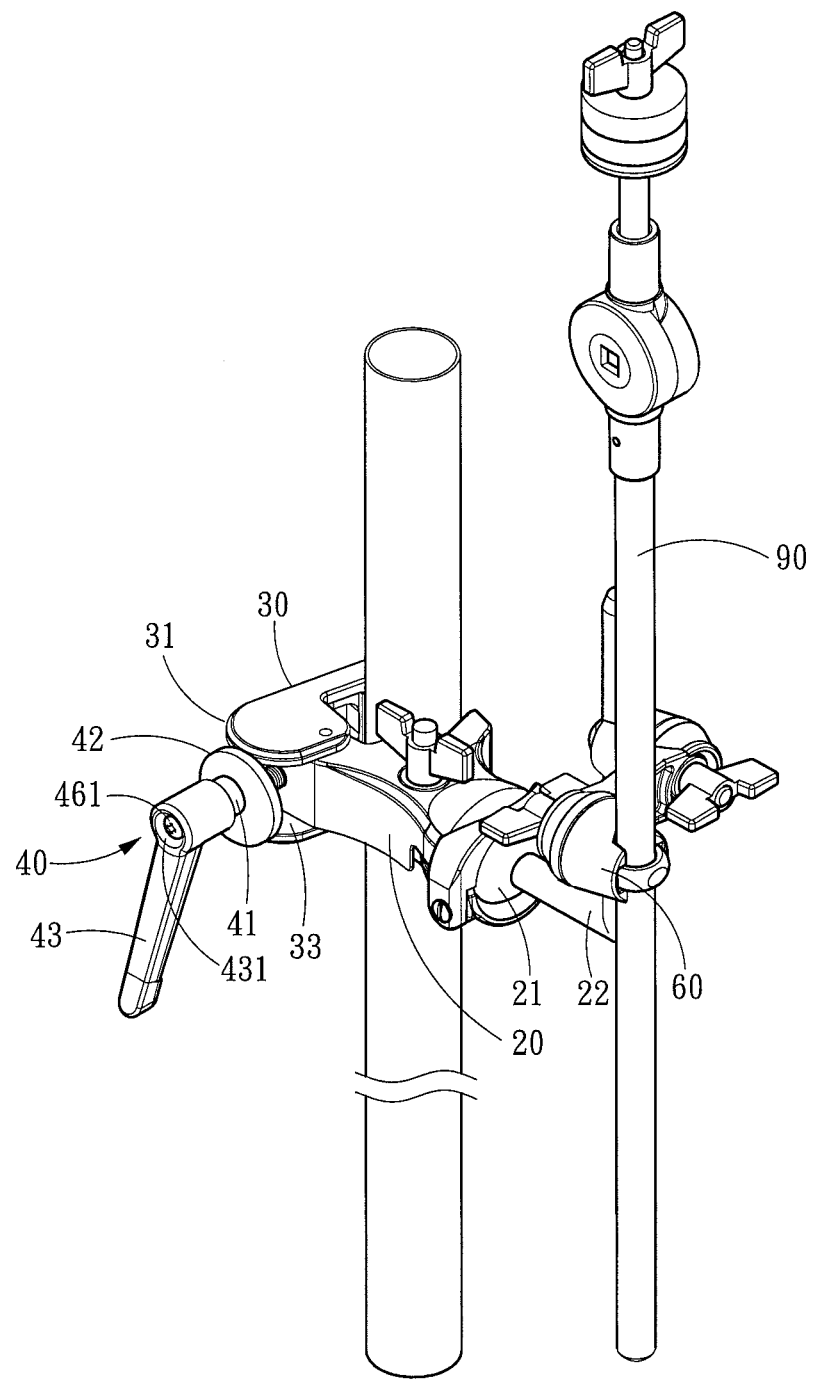
FIG. 7 is yet another implementation schematic diagram of the present invention.

The fixed part 20 according to the invention is configured to fix various musical instruments, and may be, in implementation, provided with a connector 60. As shown in FIG. 5, the connector 60 may allow a pair of cymbals 70 to be arranged thereon to fix the cymbals 70, or as shown in FIG. 6, may allow a cow-bell 80 to be arranged thereon to fix the cow-bell 80. Or as shown in FIG. 7, a spherical universal head 21 may be provided on the fixed part 20. The spherical universal head 21 is connected to an L-shaped rod 22 which is then connected to the connector 60 for assembly of a musical instrument support 90.

The movable part 30 and the fixed part 20 are locked to the stand 10. In operation, the operator can allow the rotating rod 43 to be in an actuating position first and then freely rotate the rotating rod 43 (as shown in FIG. 4B). In other words, the operator may select a most suitable force application angle, and after the rotating rod 43 is adjusted to the most suitable force application angle, the rotating rod 43 can return to the reset position (as shown in FIG. 4A) using a resetting force of the resetting assembly 44. At this moment, the ratchet 432 is engaged with the ratchet wheel section 412, i.e., the rotating rod 43 rotates to drive the bolt 41 to rotate, whereby the pressing plate 42 can be pressed to press the movable part 30 to rotate, and the clamping area 50 will be reduced and be locked and fixed to the stand 10.

In summary, the present invention at least includes the following advantages:
1. the rotating rod can freely rotate with respect to the bolt at the actuating position, and therefore, the most suitable force application angle can be selected tolock, and the musical instrument can be fixed firmly.
2. Through the resetting assembly, the rotating rod is allowed to be in a reset position under an ordinary state, and thereby the rotating rod is prevented from shaking.
3. After the rotating rod is unused (locked), the rotating rod can freely rotate with respect to the bolt to a suitable storage position, and therefore, the case where the performance is affected can be avoided; in addition, the rotating rod can be lengthened appropriately to increase a torque and reduce an effort required for locking.

What is claimed is:

1. A stand clamp with ease of force application, which is to be locked and fixed to a stand and is characterized by comprising:
   a fixed part;
   a movable part, wherein the movable part is pivotally coupled to the fixed part, and the movable part rotates with respect to the fixed part to form a clamping area and is provided with an outer curved surface at one side far away from the fixed part; and
   a screwing-lock part, wherein the screwing-lock part is provided with a bolt, a pressing plate, a rotating rod and a resetting assembly, wherein two ends of the bolt are provided with a threaded section and a ratchet wheel section respectively; the bolt presses the outer curved surface of the movable part across the pressing plate, and the threaded section passes through the pressing plate and is locked to the fixed part, such that the pressing plate presses the movable part to rotate to reduce the clamping area and to be locked and fixed to the stand; further, the rotating rod slips with respect to the bolt to form a reset position and an actuating position; the resetting assembly is linked to the bolt and the rotating rod, such that the rotating rod is in the reset position under an ordinary state, and the rotating rod is provided with a ratchet which is engaged with the ratchet wheel section correspondingly at the reset position; in addition, the rotating rod can freely rotate with respect to the bolt at the actuating position.

2. The stand clamp with ease of force application of claim 1, wherein the resetting assembly is provided with a compression spring and a nut, wherein the nut is provided with a head part and a screwing-lock stud; the screwing-lock stud passes through the rotating rod and is locked to the bolt, and a variable gap is formed between the head part and the rotating rod; the compression spring is provided inside the variable gap in a compressed manner; the rotating rod is kept in the reset position under an ordinary state, and the rotating rod slips with respect to the bolt to compress the variable gap, till the ratchet is separated from the ratchet wheel section and is in the actuating position.

3. The stand clamp with ease of force application of claim 2, wherein the rotating rod is provided with a recessed space for accommodating the head part.

4. The stand clamp with ease of force application of claim 1, wherein the rotating rod is provided with an inner ring surface through which the ratchet wheel section passes and on which the ratchet is formed.

5. The stand clamp with ease of force application of claim 1, wherein each of the movable part and the fixed part is provided with a cushion contacting the stand.

6. The stand clamp with ease of force application of claim 1, wherein the movable part is provided with an accommodating groove through which the fixed part is embedded.

* * * * *